May 19, 1970   J. L. CORTEZ   3,512,561
COPYING LATHE
Filed March 12, 1969
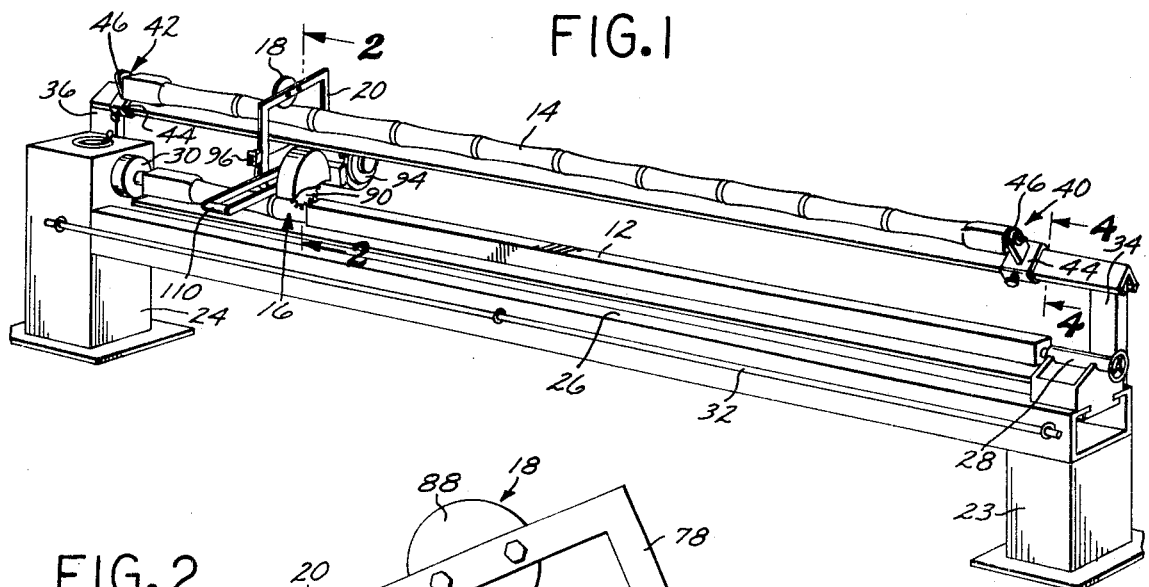
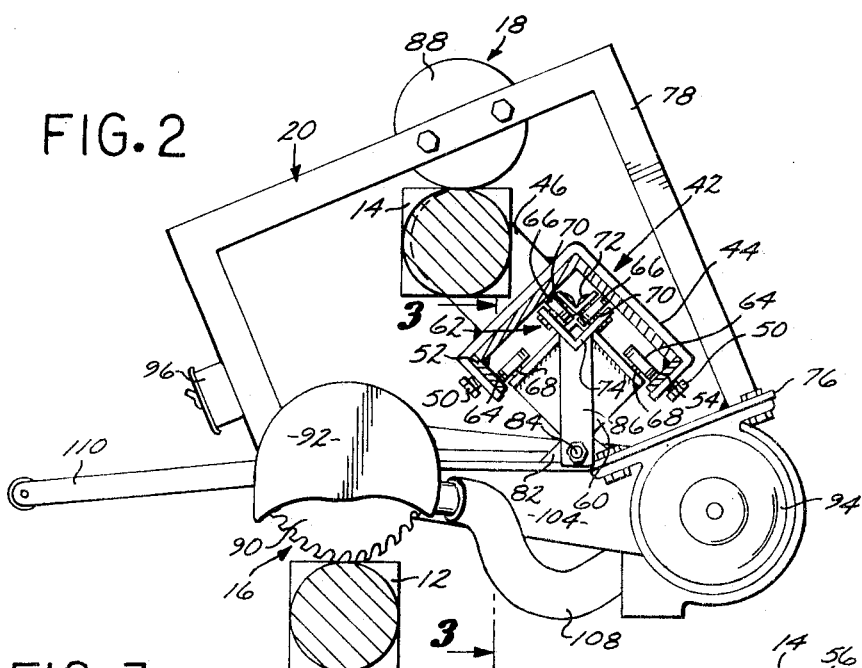
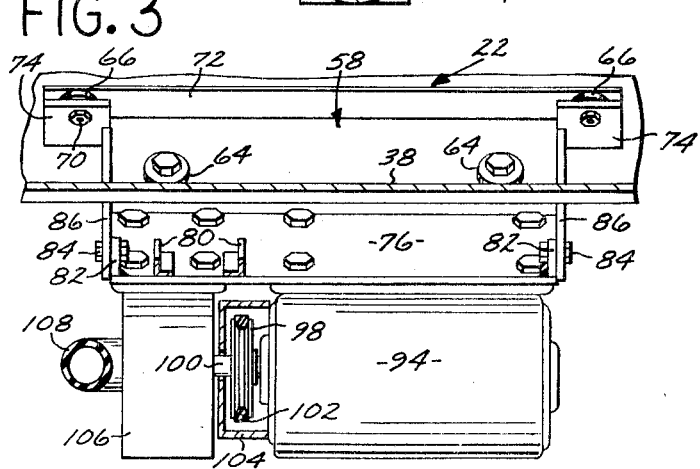
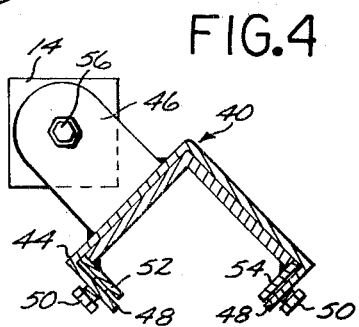
INVENTOR.
JOSÉ L. CORTEZ
BY Fulwider, Patton, Rieber,
Lee and Utecht
ATTORNEYS

United States Patent Office 3,512,561
Patented May 19, 1970

3,512,561
COPYING LATHE
Jose Lopes Cortez, 9050 E. Jeff St.,
Bellflower, Calif. 90706
Filed Mar. 12, 1969, Ser. No. 813,398
Int. Cl. B23b 3/28
U.S. Cl. 142—37                                3 Claims

ABSTRACT OF THE DISCLOSURE

A copying lathe including means for mounting a template and a piece of stock on parallel axis, such means effecting rotation of the stock. A carriage mounted on a track for movement parallel to said axis and including a follower for tracing the template and a cutting tool for forming the rotating stock.

BACKGROUND OF THE INVENTION

Field of the invention

The present invention relates to a wood turning lathe and, more particularly, to an improved copying or pattern lathe which enables an operator to rapidly and accurately cut a workpiece to the exact profile of a template.

Description of the prior art

Generally speaking, a copying lathe is a lathe capable of processing a workpiece such that its profile conforms to that of a given template. Heretofore, copying lathes have been quite expensive and have included complex linkages and drive mechanisms between the cutting tools and feelers for following the contour of a template. Such copying lathes also have been relatively slow in operation.

SUMMARY OF THE INVENTION

The copying lathe of present invention is characterized by a pivotable member carrying both a follower for tracing a template and a cutting tool for shaping a piece of rotating stock.

An object of the present invention is to provide an improved manually controllable copying lathe for rapidly cutting a workpiece to the exact profile of a template.

Another object of the present invention is to provide a simplified copying lathe which does not include any complex drive or linkage mechanisms and which is therefore relatively inexpensive.

A further object of the present invention is to provide a copying lathe of the foregoing character which is easy to operate.

Still another object of the present invention is to provide a copying lathe having the foregoing advantages, which is also capable of handling different size workpieces and templates and which is specially suited to cutting table legs, posts and other elongated members.

The foregoing as well as other objects and advantages of the present invention may be more clearly understood by reference to the following detailed description when considered with the drawings which by way of example only, illustrates one form of copying lathe embodying the features of the present invention.

In the drawing:

FIG. 1 is a perspective view of the copying lathe cutting a workpiece to the exact profile of a template;

FIG. 2 is a sectional view taken along the line 2—2 in FIG. 1;

FIG. 3 is a sectional view taken along the line 3—3 in FIG. 2; and

FIG. 4 is a sectional view taken along the line 4—4 in FIG. 1.

In the drawing, the copying lathe is represented by the numeral 10 and generally speaking includes structure for supporting a workpiece 12 and a template 14 in different horizontal planes, and means (not shown) for turning the workpiece on a horizontal axis of rotation. In addition, the copying lathe 10 includes a workpiece cutting device 16 and a follower 18 secured to a frame 20 pivotally connected to a traveling carriage 22. The carriage 22 is manually movable in directions parallel to the axis of rotation of the workpiece 12, while the cutting device 16 and follower 18 are swingable with the frame 20 into engagement with the workpiece and the template, respectively. Thus arranged, movement of the carriage 22 with the follower 18 in contact with the template 14 causes the cutting device 16 to quickly and simply cut the workpiece 12 to the exact profile of the template.

More specifically, the cutting lathe 10 includes upstanding end supports 23 and 24 for a horizontal bed 26. Above the bed 26, the upstanding end support 23 provides horizontal support for an axially adjustable tail stock 28 while the end support 24 supports a head stock 30. The head and tail stocks are of conventional design and are aligned with each other in a horizontal plane to axially support the workpiece 12 for turning about a horizontal axis. In the drawing, the workpiece 12 is illustrated as comprising an elongated member of rectangular cross section which is to be cut to the form of a post having a profile of the template 14.

As in conventional lathes, the head stock 30 is adapted to turn in response to operation of a motor drive contained within the end support 24. The motor drive is energized by closing a switch connected to an elongated bar 32 supported for horizontal movement along the front of the bed 26. The bar 32 allows the lathe to be turned on and off by an operator standing in any position along the front of the lathe.

Extending upward from and to the rear of the upstanding end supports 23 and 24 are verticals 34 and 36. The verticals support an inverted V-shaped guide member 38 in a horizontal plane parallel to, above, and to the rear of the workpiece 12. The guide member 38 functions both as a guide and support for the carriage 22 as well as a support for the structure holding the template 14 in a horizontal plane parallel to and above the workpiece 12.

With regard to the template 14, the support structure includes a pair of clamps 40 and 42. The clamps each include an inverted V-shaped base portion 44 and an upwardly extending support plate 46 connected to the base. The base portions 44 are slightly larger than the cross section of the guide member 38 (see FIG. 4). This allows the base portions to fit over and slide along the guide member 38 and permits the clamps to hold templates of different lengths. Opposite ends of the base portions 44 include inwardly extending flanges 48 through which pass adjustable set screws 50 for pressing against similar flanges 52 and 54 extending the length of the guide member 38. Tightening the screws 50 against the flanges 52 and 54 locks the clamps 40 and 42 in place on the guide member 38.

To hold the template 14 in place, adjustable screws 56 extend horizontally through the support plates 46 to tightly engage the right and left ends of the template and to thereby securely hold the template in a horizontal plane parallel, above, and to the rear of the workpiece 12.

With regard to the carriage 22, the flanges 52 and 54 extend normal to the sides of the guide member 38 and define support surfaces for the carriage 22 within the guide member.

Generally speaking, the carriage 22 is adapted to move back and forth along the guide member 38 and to pivotally support the frame 20 carrying the cutting device 16 and follower 18 for vertical swinging movement into and out of engagement with the workpiece 12 and template 14, respectively. To accomplish the foregoing, the carriage 22 may take various forms. By way of example only, the carriage 22 illustrated in the drawing includes an inverted V-shaped channel member 48 closed at right and left ends by diamond-shaped end pieces 60, and a roller assembly 62 for transporting the carriage along and within the guide member 38.

The roller assembly 62 includes pairs of lower and upper rollers 64 and 66 at right and left ends of the carriage structure. The lower rollers 64 are carried on the ends of short shafts 68 extending through and secured to the sides of the channel member 58 and are adapted to engage and roll along the inner surfaces of the flanges 52 and 54. The upper rollers 64, on the other hand, are adapted to roll along the inner surfaces of the sides of the guide member 38. To this end the rollers 64 are supported for turning on shafts 70 extending between corresponding sides of V-shaped channel members 72 and 74. The member 72 is connected to the top of the channel member 58 and extends outwardly beyond right and left ends thereof, while the members 74 are stationed below right and left ends of the member 72 and extend from the diamond-shaped end pieces 60 of the channel member 58.

In the foregoing manner, the roller assembly 62 supports the carriage 22 for movement along the inside of the guide member 38 in directions parallel to the horizontal axis of the workpiece 12.

As previously indicated, the carriage 22 provides support for the cutting device 16 and follower 18 via the frame 20. As illustrated most clearly in FIGS. 1 and 2, the frame 20 includes a substantially flat support plate 76, a generally U-shaped member 78 having one end secured to the top of the plate, and a pair of connecting arms 80 between the U-shaped member and the top of the plate. A pair of tabs 82 extend upwardly from right and left ends of the support plate 76 and are pivotally connected by horizontal pins 84 to vertical straps 86 connected to and extending downwardly from the end members 60 of the carriage 22. In this manner, the frame 20 is pivotally connected to the carriage 22 for swinging movement in a vertical plane normal to the axis of rotation of the workpiece 12 and as illustrated in FIGS. 1 and 2 is adapted to swing the follower 18 and the cutting device 16 downward into engagement with the template and the workpiece, respectievly.

In this respect, the follower 18 comprises a disk 88. The disk 88 is secured to the upper crosspiece of the U-shaped member 78 above the template 14 and is adapted to swing with the frame 20 into engagement with the top of the template and to thereby limit downward movement of the cutting device 16 into the workpiece 12.

The cutting device 16, on the other hand, includes a rotatable saw blade 90 supported for turning within a housing 92 connected to the U-shaped member 78. The cutting device also includes an electric motor 94 secured to and carried by the support plate 76 for driving the saw blade 90. The saw blade is located directly above the workpiece 12 and is adapted to swing downwardly with the frame 20 to engage and cut into the workpiece to an extent defined by the template 14 and the follower 18.

To control the operation of the electric motor 94 and hence the turning of the saw blade 90, a manual on-off switch 96 is connected to the front piece of the U-shaped member 78 within easy reach of the operator. The switch is in series with circuitry (not shown) for energizing the motor. Therefore, when it is desired to operate the saw, the operator simply turns on the motor by closing the switch 96.

The drive for the saw blade 90 from the motor 94 is most clearly illustrated in FIG. 2 as comprising a pulley 98 on the output shaft 100 of the motor and a belt 102 extending around the pulley and connected to a similar pulley on the shaft of the saw blade (not shown). The belt 102, as well as the pulleys, are covered by a shroud 104 to prevent foreign particles from working their way around the shaft and impairing efficient motor operation.

In this regard, the motor 94 also operates a fan 106 for drawing sawdust and other foreign particles from the area of the saw blade 90 through the housing 92 and a vacuum hose 108 for collection external to the workpiece 12. This maintains the workpiece clear of foreign particles during cutting and allows the operator to clearly see that the workpiece profile is conforming to that of the template 14.

To enable the operator to guide the saw blade 90 into contact with the workpiece 12 and the follower 18 into contact with the template 18, and to then move the combination including the frame 20 and carriage 22 along the guide member 38, the copying lathe 10 includes a handle 110 extending from the connecting portion of the frame forward for easy hand gripping by the operator.

Therefore, in order to cut the workpiece 12 to exact profile of the template 14, the template and workpiece are first mounted in the positions illustrated in FIG. 1 and the carriage 22 moved to the left end of the workpiece. Next, the lathe 10 and motor 94 are turned on to rotate the workpiece 12 and drive the saw blade 90. The operator then grasps the handle 110 and swings the saw blade 90 and follower 18 downward until the saw blade engages the workpiece and the follower contacts the template 14. The follower 18 contacting the template 14, limits the downward swinging movement of the saw blade 90 and defines the extent to which the blade cuts into the workpiece 12. With the saw blade cutting the turning workpiece, the operator then moves the carriage 22, frame 20, follower 18 and cutting device 16 to the right. In moving to the right, the follower 18 moves along the surface of the template 14, causing the saw blade 90 to raise and lower as the operator continues to press downwardly on the handle 108. In this manner, the saw blade cuts the workpiece to the exact profile of the template. In this respect, it is important that the frame 20 support the saw blade and follower such that when the follower engages the template, the radial dimensions of the workpiece and template are the same. This insures that as a finished product the workpiece will conform exactly to the exterior pattern of the template.

At any point during the travel of the carriage 22, the motor 94 may be de-energized by opening the switch 96 and the operator may release the handle 110 to allow the frame 20 to pivot upwardly away from the workpiece 12. The workpiece then may be removed from the copying lathe and another inserted and the cutting operation repeated. Alternatively, if it is desired to cut a different shape, the template 14 may be replaced with a different template of the same or different length and the foregoing operation continued or repeated.

While a particular form of copying lathe has been described in some detail herein, changes and modifications may be made in the illustrated form without departing from the spirit of the invention. It is therefore intended that the present invention be limited in scope only by the terms of the following claims.

I claim:
1. A copying lathe comprising:
   first support means for holding and turning a workpiece on a predetermined axis;
   second support means for holding a template in a plane above said workpiece and substantially parallel thereto;
   a guide member extending parallel to said axis and lying to the rear and above said workpiece;
   a carriage movable along said guide member;
   a frame pivotally connected to said carriage at a point to the rear of said workpiece;
   a workpiece cutting means mounted on said frame above said workpiece to be swung downward into contact therewith; and a follower carried from said frame for engagement with the upper surface of the template to limit movement of said cutting means toward said predetermined axis whereby movement of said carriage along said guide member with said follower in contact with said template causes said cutting means to cut said workpiece to a profile corresponding to the profile of said template.

2. The copying lathe of claim 1 wherein said second support means comprises a pair of clamps connected to said guide member for supporting opposite ends of said template.

3. The copying lathe of claim 1 wherein said clamps are selectively movable along said guide member to accommodate different size templates.

References Cited

UNITED STATES PATENTS

| 1,540,801 | 6/1925 | O'Neel | 142—37 |
| 1,859,474 | 5/1932 | Shawver | 142—38 XR |
| 2,624,378 | 1/1953 | Di Rosa et al. | 142—38 |
| 2,731,047 | 1/1956 | Webb | 142—55 |

FOREIGN PATENTS 114,733   4/1926   Switzerland.

LEONIDAS VLACHOS, Primary Examiner

U.S. Cl. X.R.

82—14; 142—38, 55